United States Patent [19]

Okamoto et al.

[11] Patent Number: 4,856,631
[45] Date of Patent: Aug. 15, 1989

[54] PERMANENT MAGNET COUPLING TORQUE LIMITER

[75] Inventors: Kiyohide Okamoto; Ryosuke Okita; Masaya Yamada, all of Himeji, Japan

[73] Assignee: Mitsubishi Denki Kabushiki Kaisha, Japan

[21] Appl. No.: 217,293

[22] Filed: Jul. 11, 1988

[30] Foreign Application Priority Data

Jul. 24, 1987 [JP] Japan .................. 62-114013

[51] Int. Cl.$^4$ .................... F16F 15/03; F16D 43/20
[52] U.S. Cl. ........................... 192/21.5; 192/56 R; 192/84 PM; 464/29
[58] Field of Search ............... 192/21.5, 56 R, 84 PM; 464/29

[56] References Cited

U.S. PATENT DOCUMENTS

| | | | |
|---|---|---|---|
| 2,544,360 | 3/1951 | Schmidt | 192/21.5 |
| 2,604,198 | 7/1952 | Stephenson | 192/21.5 |
| 2,612,248 | 9/1952 | Feiertag | 192/21.5 |
| 2,650,684 | 9/1953 | English, Jr. et al. | 192/21.5 |
| 2,709,507 | 5/1955 | Trickey | 192/21.5 |
| 2,815,106 | 12/1957 | Leff et al. | 192/21.5 |
| 3,400,795 | 9/1968 | Miller | 192/56 R |
| 3,559,784 | 2/1971 | Miller | 192/56 R |
| 3,584,715 | 6/1971 | Miller | 192/56 R |
| 4,239,092 | 12/1980 | Janson | 192/21.5 |

FOREIGN PATENT DOCUMENTS 58-187627 12/1983 Japan .

OTHER PUBLICATIONS

Brochure entitled "Permanent Magnet Torque Limiters", Smiths Industries Limited, Apr. 1969.

Primary Examiner—Dwight G. Diehl
Assistant Examiner—Nicholas Whitelaw
Attorney, Agent, or Firm—Leydig, Voit & Mayer

[57] ABSTRACT

A torque limited of permanent magnet coupling type is disclosed, in which the value of transmitted torque is varied from a near zero minimum to a maximum. The torque limiter comprises a disk of magnetic material fixed to the output cylinder, and a pair of annular members disposed on both axial sides of the disk with small gaps filled with a powder of magnetic material. The annular members are rotatably supported on the output cylinder. An annular disk-shaped permanent magnet is fixed to one of the annular members at the side surface thereof opposite to the surface facing the disk. Further, an annular disk-shaped plate of magnetic material having an outer diameter greater than that of the permanent magnet is fixed on the outer side surface of the permanent magnet projecting radially from the outer circumferential surface of the permanent magnet. A tube-shaped adjustment member is axially slidable on the outer circumferential surface of a ring of non-magnetic material fitted into the opposing steps formed on the outer circumferential surfaces of the annular members, forming small gaps between the inner circumferential surface of reduced diameter portion thereof and the outer circumferential surfaces of the pair of annular members, and between the inner circumferential surface of increased diameter portion thereof and the outer circumferential surface of the annular disk-shaped plate.

9 Claims, 2 Drawing Sheets

PERMANENT MAGNET COUPLING TORQUE LIMITER

BACKGROUND OF THE INVENTION

1. Field of the Invention

The present invention relates to torque limiters which are capable of adjusting the magnitude of the transmitted torque, and more particularly to such torque limiters which utilize magnet coupling to transmit the torque.

2. Description of the Prior Art

Torque limiters are used to transmit torque which does not exceed a predetermined magnitude. FIG. 1 shows a conventional torque limiter utilizing permanent coupling to transmit torque, which is disclosed in Japanese laid-open utility model application No. 58-187627. The disclosed torque limiter comprises an interior and an exterior rotating portion, the torque being transmitted from the exterior to the interior portion, or vice versa.

The interior portion of the torque limiter of FIG. 1 is constituted as follows. The interior rotating member 1 is made of a non-magnetic material and has a main hollow cylindrical portion 1a fixedly mounted by a key on the shaft 2 of an apparatus to or from which the torque is transmitted. The member 1 has a annular flange 1b projecting radially from the main cylindrical portion 1a thereof. Annular disk 1c of magnetic material is fixedly secured to the flange 1b by means of a shrinkage fit to form a rotating disk therewith. Thus, in the case of the torque limiter of FIG. 1, the rotating disk is made of two pieces, i.e., of an annular disk 1c of magnetic material and a non-magnetic flange 1b of the rotating member 1. However, the disk 1c and the member 1 may be made of a single piece of magnetic material.

The structure of the exterior rotating portion of the torque limiter of FIG. 1 is as follows. A pair of exterior rotating members 3 and 4 are rotatably supported on the interior rotating member 1 by the bearings 3a and 4a, respectively. The exterior rotating members 3 and 4 have an inner axially directed surfaces 3b and 4b opposing the axially directed surfaces of the interior rotating disk 1c and 1b. A ring 5 of non-magnetic material is fitted into the recess formed by the opposing inner step-formed portions 3c and 4c formed on the outer circumferential surfaces of the exterior rotating members 3 and 4. Further, an annular permanent magnet 6 is fitted around the ring 5 between the outer step-form portions 3d and 4d of the exterior rotating members 3 and 4. The exterior rotating member 3 has an outer diameter slightly greater than that of the permanent magnet 6, and has a male thread 3e formed on the outer circumferential surface thereof, around which a hollow cylindrical adjustment member 7 is fitted by means of a female thread 7a formed on the inner circumferential surface thereof and screwed around the male thread 3d of the member 3. The adjustment member 7 is turned around the member 3 to be moved in the axial direction thereof. Thus, the clearance gap g between the inner side surface of the flange 4c of the exterior rotating member 4 and the end surface of the adjustment member 7 opposing thereto can be adjusted by the turning of the member 7, thereby varying the magnetic resistance of the magnetic circuit $\phi 1$. The screw 8 is turned in to fasten the adjustment member 7 to the exterior rotating member 3. Sealing members 3f and 4f, such as mechanical seals, and the exterior rotating members 3 and 4, are disposed between the inner rotating member 1 and the exterior rotating members 3 and 4, respectively.

A predetermined amount 9 of a powder of a magnetic material fills the gaps formed between the opposing surfaces of the rotating disk 1c and the exterior rotating members 3 and 4. Thus, the powder 9 forms part of the magnetic circuit $\phi 2$ together with the exterior rotating members 3 and 4 and the permanent magnet 6, and is magnetized by the magnetic flux passing therethrough, to bond the disk 1c with the exterior rotating members 3 and 4.

When the load or the resistive torque on the interior rotating member 1 does not exceed a pre-set value, the interior rotating disk 1c and the pair of exterior rotating members 3 and 4 are bonded together by the magnetized powder 9 and are rotated together without slip, transmitting the torque from the input to the output portion of the torque limiter. When, however, the resistive torque on the interior rotating member 1 exceeds a pre-set value and overcomes the coupling force of the magnetized powder 9, the disk 1c slips with respect to the exterior rotating members 3 and 4, allowing relative rotation thereof with respect to the exterior rotating members 3 and 4, thereby limiting the transmitted torque to the pre-set value.

The maximum value of the transmitted torque is adjusted as will be explained hereunder.

The magnetic circuits $\phi 1$ and $\phi 2$ passing through the permanent magnet 6 are formed. The first circuit $\phi 1$ passes through the permanent magnet 6, the gap g, and the member 7, as well as portions of the exterior rotating members 3 and 4. The second circuit $\phi 2$ passes through the permanent magnet 6, portions of the exterior rotating members 3 and 4, the interior rotating disk 1c disposed therebetween, and the powder of magnetic material 9. By varying the dimension of the gap g between the members 4 and 7, the magnetic reluctance of the first magnetic circuit $\phi 1$ and the magnetic flux passing therethrough are changed. Thus, the amount of magnetic flux passing through the second magnetic circuit $\phi 2$ is varied, and the value of the transmitted torque is changed.

The type of the permanent magnet torque limiters as described above, however, have disadvantages as will be explained hereunder.

In the adjustment of the maximum value of the transmitted torque, only the magnetic reluctance of the first or leakage magnetic circuit $\phi 1$ passing through the gap g is changed, while that of the second circuit $\phi 2$ passing through the interior rotating disk 1c and the powder 9 remains constant. Thus, it is not possible to limit the transmitted torque to a very small value near zero, because even when the gap g is closed, there remains a substantial amount of magnetic flux in the second magnetic circuit $\phi 2$. Further, the total amount of the magnetic flux passing through the first and second magnetic circuits $\phi 1$ and $\phi 2$, i.e., the amount of flux passing through the permanent magnet 6, changes with the adjustment of the gap g. Thus, demagnetization of the permanent magnet is incurred by repeated adjustment operations over a long period of usage. Furthermore, the permanent magnet 6 incorporated in the torque limiter should have a linear demagnetization curve, and accordingly the permanent magnet 6 which can be used therein is limited to magnets having such a property.

SUMMARY OF THE INVENTION:

Thus, a main object of the present invention is to provide a torque limiter of the permanent magnet coupling type in which the adjustment of the transmitted torque does not substantially affect the amount of magnetic flux passing through the permanent magnet, and further, the value of the transmitted torque can be varied in a wide range from a near zero minimum fully exploiting the power of the permanent magnet.

A further object of the present invention is to provide such a torque limiter which is simple in construction and low in cost.

The above-mentioned objects are accomplished according to the present invention by a torque limiter comprising a hollow cylindrical member, a disk of magnetic material fixed on the hollow cylindrical member, a pair of annular members disposed on both sides of the disk to form gaps between the surfaces of the disk and those of the annular members, a powder of magnetic material filling the gaps between the disk and the annular members to form a bond therebetween, an annular disk-shaped permanent magnet fixed to one of the annular members at a side surface thereof opposite to the surface opposing the disk, and a substantially tube-shaped adjustment member disposed around the pair of annular members and the disk.

The adjustment member is slidable in the axial direction and has an inner circumferential surface portion opposing the outer circumferential surfaces of the pair of annular members across small gaps. The area of the inner circumferential surface portion of the adjustment member opposing the outer circumferential surface of one of the annular members increases and decreases as the area of the inner circumferential surface portion opposing the outer circumferential surface of the other one of annular members decreases and increases, respectively, when the adjustment member slides in the axial direction relative to the pair of annular members. The tube-shaped adjustment member forms part of a first and a second magnetic circuit passing through the permanent magnet. The first magnetic circuit passes through the permanent magnet, a portion of the adjustment member, and the annular member to which the permanent magnet is fixed. The second magnetic circuit passes through the permanent magnet, a portion of the adjustment member, the pair of annular members, the disk disposed between the pair of annular members, and the powder filling the gaps between the disk and the pair of annular members.

The torque limiter according to the present invention preferably comprises a ring of non-magnetic material fitted into the recess formed by the two opposing steps formed on the outer circumferential surfaces of the pair of annular members. The adjustment member preferably have a reduced diameter portion having an inner circumferential surface which opposes the outer circumferential surfaces of the pair of annular members across small gaps and slides on the outer circumferential surface of the ring. It is also preferred that an annular disk-shaped plate of magnetic material having an outer diameter greater than that of the permanent magnet is fixed to one of the annular members at the surface thereof opposite to that facing the disk. The plate projects radially from the outer circumferential surface of the permanent magnet, and the outer circumferential surface of the plate opposes the inner circumferential surface of a portion of the adjustment member of increased diameter. Thus, the plate forms part of both the first and the second magnetic circuits.

Preferably, the sum of the magnetic fluxes of the first and the second magnetic circuits is held substantially constant when the adjustment member is slided in the axial direction to change the maximum value of transmitted torque.

BRIEF DESCRIPTION OF THE DRAWINGS

Further details of the present invention will become more clear in the following detailed description of the preferred embodiments taken in conjunction with the accompanying drawings, in which.

DETAILED DESCRIPTION OF THE PREFERRED EMBODIMENTS

Figure 1:
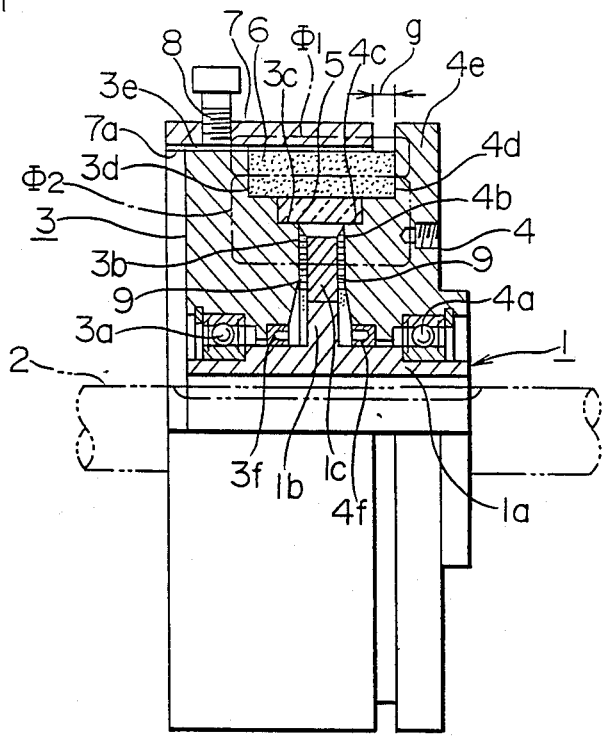
FIG. 1 is a partial sectional side view of a conventional torque limiter of permanent magnet coupling type, showing the upper half of the torque limiter in cross section.
Figure 2:
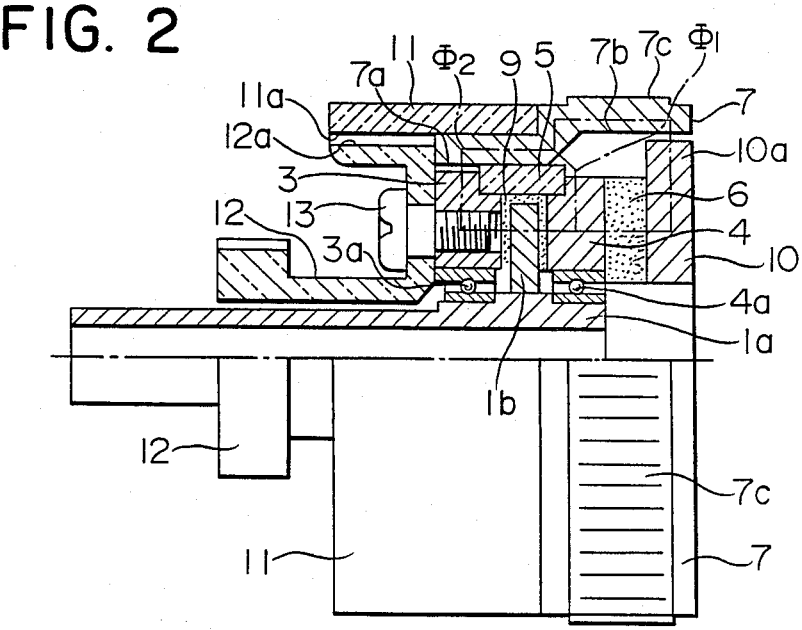
FIG. 2 is a view similar to that of FIG. 2, but showing an embodiment of the present invention which is in a state in which the pre-set value of transmitted torque is at its maximum.
Figure 3:
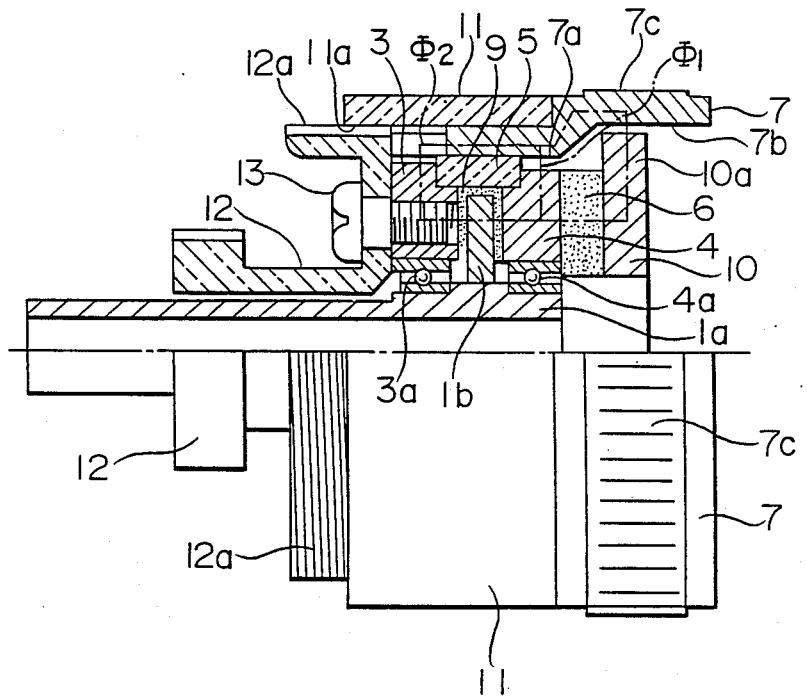
FIG. 3 is a view of the torque limiter of FIG. 2, showing the torque limiter in a state in which the pre-set value of transmitted torque is at its minimum.

Referring now to FIGS. 2 and 3 of the drawings, a preferred embodiment of the present invention is described. The torque limiter of FIGS. 2 and 3 comprises interior and exterior rotating portions, the torque being transmitted from the exterior to the interior portion, or vice versa.

The interior rotating portion, which usually constitute the output of the torque limiter, comprises a hollow cylindrical rotating member 1a of non-magnetic material which is coupled to a shaft of an apparatus not shown to which the torque is transmitted. A disk 1b of magnetic material is fixedly mounted on the outer circumferential surface of the cylindrical member 1a to form a radially extending annular flange.

The exterior rotating portion, which usually constitute the input of the torque limiter and is rotatable as a single piece around the interior rotating portion, is constituted as follows.

A pair of annular thick disk-shaped rotating members 3 and 4 of magnetic material are rotatably supported on the interior cylindrical rotating member 1a by the bearings 3a and 4a, respectively, on both axial sides of the disk 1b to form small gaps between the axially directed surfaces of the disk 1b and the axially directed inner surfaces of the members 3 and 4. A ring 5 of non-magnetic material is fixed into the recess formed by the opposing step-formed portions formed on the outer circumference of the annular rotating members 3 and 4 to bridge the two members 3 and 4, forming a small gap between the outer circumferential surface of the disk 1b and the inner circumferential surface of the ring 5.

Annular disk-shaped permanent magnet 6 is fixedly secured to the annular member 4 at the axially directed side surface thereof opposite to the side at which the disk 1b is situated. Annular disk-shaped plate 10 of magnetic material having a larger outer diameter than that of the magnet 6 is secured on the axially directed outer side surface of the magnet 6, forming a radially extending projection 10a. A substantially tube-shaped adjustment member 7 of magnetic material is axially slidable on the outer circumferential surface of the ring 5 at an inner circumferential surface 7a of reduced diameter which opposes the outer circumferential surfaces of the annular members 3 and 4 with small gaps formed therebetween. As shown in FIG. 3, the gap between member 7 and the annular member 4 is wider than the gap between the member 7 and the annular member 3. The inner circumferential surface 7b of increased diameter portion thereof opposes the outer circumferential surface of the plate 10 across a small gap. The adjustment member 7 has knurlings 7c formed on the outer circumferential surface thereof. A screw tube 11 of non-magnetic material fixedly secured to the step-formed recess formed on the outer circumferential surface of the adjustment member 7 has a female thread 11a formed on the inner circumferential surface thereof. The screw support member 12 of non-magnetic material having a cross-section of double U-shape which is symmetric with respect to the rotational axis is secured by fastening screws 13 to the outer axially directed surface of the annular member 3 at the bases of the U's thereof. The screw support member 12 has formed on the outer circumferential surface thereof a male thread 12a which engages with the female thread 11a of the screw tube 11. Thus, by turning the tube 11 around the support member 12, the adjustment member 7 can be slided in the axial direction on the outer circumferential surface of the ring 5 from the position shown in FIG. 2 to that shown in FIG. 3, and vice versa.

An amount of powder 9 of magnetic material is filled in the gaps formed between the disk 1b and the pair of annular members 3 and 4. The powder is magnetized by the magnetic flux passing therethrough and is aligned in the direction of the line of magnetic force to bond the axially directed opposing surfaces of the disk 1b and the pair of annular members 3 and 4.

Thus, as long as the resistive torque on the hollow cylindrical member 1a does not exceed a pre-set magnitude, the disk 1b and the pair of annular members 3 and 4 rotate together without slip, transmitting the torque applied to the exterior or input portion of the torque limiter including the pair of annular members 3 and 4 to the interior or output portion thereof. When the resistive torque on the hollow cylindrical member 1a exceeds the pre-set value, however, the coupling between the disk 1b and the annular members 3 and 4 begins to slip, thereby allowing relative rotation of the interior or output portion of the torque limiter with respect to the exterior or input portion thereof, thereby limiting the magnitude of the transmitted torque to the pre-set value.

The value of the maximum torque transmitted by the torque limiter is adjusted as will be explained herebelow.

Two magnetic circuits including the permanent magnet 6 are formed in the exterior portion of the torque limiter. The first magnetic circuit $\phi 1$ passes through the permanent magnet 6, the annular plate 10, a portion of the tube-shaped adjustment member 7, and the annular member 4 to which the magnet 6 is fixed. The second magnetic circuit $\phi 2$ passes through the permanent magnet 6, the annular plate 10, a portion of the tube-shaped adjustment member 7, the pair of annular members 3 and 4, the disk 1b disposed therebetween, and the magnetic powder 9 filling the gaps between the disk 5 and the annular members 3 and 4. The proportion of the areas of the inner circumferential surface of the reduced diameter portion of the adjustment member 7 which oppose the outer circumferential surfaces of the pair of annular members 3 and 4 through small gaps changes with the axial translation of the adjustment member 7, as shown in FIGS. 2 and 3. The total area, i.e. the sum of the areas, of the inner surface of the reduced diameter portion of the adjustment member 7 opposing the outer surfaces of the annular members 3 and 4 through small gaps, however, remains substantially constant, the area opposing the member 3 decreasing with the increase of the area opposing the member 4 and vice versa. On the other hand, the area of the inner circumferential surface of the adjustment member 7 opposing the outer circumferential surface of the plate 10 through a small gap is not changed with the axial translation of the adjustment member, the whole outer circumferential area of the plate 10 always opposing the inner circumferential surface of the adjustment member 7 through a small gap as shown in FIGS. 2 and 3.

Thus, when the adjustment member 7 is moved axially from the position shown in FIG. 2 to that shown in FIG. 3, the magnetic flux passing through the second magnetic circuit $\phi 2$ changes from a maximum to a near zero minimum, while the magnetic flux passing through the first magnetic circuit $\phi 1$ changes from a near zero minimum to a maximum. Thus, the magnitude of the transmitted torque can be varied from a near zero minimum to a maximum fully exploiting the power of the permanent magnet 6. The total magnetic flux which passes through the permanent magnet, however, remains substantially constant, so that the permanent magnet 6 is kept substantially on the same magnetization level. Thus, demagnetization thereof by repeated adjustment operations through a long period of usage can be effectively prevented.

What is claimed is:

1. A torque limiter for transmitting torque which is less than or equal to a pre-set magnitude that can be varied comprising:

a hollow cylindrical member;

a disk of magnetic material fixedly secured to said hollow cylindrical member and extending radially from an outer circumferential surface of said hollow cylindrical member;

first and second annular members of magnetic material rotatably supported on said hollow cylindrical member, said annular members being disposed at two axial sides of said disk to form gaps between axially directed surfaces of said disk and axially directed surfaces of said annular members opposing said axially directed surfaces of said disk, said annular members having first and second outer circumferential surfaces, respectively;

an amount of powdered magnetic material disposed in said gaps between said disk and said first and second annular members;

an annular disk-shaped permanent magnet fixedly secured to said second annular member at an axially directed surface thereof opposite to the axially directed surface opposing said disk; and a substantially tube-shaped adjustment member of magnetic material axially slidably disposed around said annular members and said permanent magnet, said tube-shaped adjustment member having an inner circumferential surface including third and fourth portions opposing the first and second outer circumferential surfaces through small first and second gaps of different constant radial dimensions over first and second areas, respectively, which vary substantially inversely as said adjustment member slides axially, said tube-shaped adjustment member forming part of a first and a second magnetic circuit, each having magnetic flux flowing through the respective circuit, the magnetic flux generated by said permanent magnet;

said first magnetic circuit passing through said permanent magnet, a portion of said adjustment member, said second gap, and said second annular member;

said second magnetic circuit passing through said permanent magnet, a portion of said adjustment member, said first gap, both said first and second annular members, said disk disposed between said annular members, and said amount of powder of magnetic material disposed in the gaps between said disk and said first and second annular members;

the first magnetic circuit having a reluctance determined in part by the radial dimension of said second gap, the second magnetic circuit having a reluctance determined in part by the radial dimension of said first gap and said gaps having said powdered magnetic material, the second gap having a greater constant radial dimension than the constant radial dimension of the first gap, and the sum of the magnetic reluctances of the first and second magnetic circuits being substantially constant as said adjustment member is adjusted, such that the total flux flowing through the magnetic circuits and generated by said permanent magnet remains substantially constant and whereby said permanent magnet remains at a substantially constant magnetization level over long periods of usage notwithstanding repeated axial adjustments of said adjustment member.

2. A torque limiter as claimed in claim 1, wherein the inner circumferential surface portion of said tube-shaped adjustment member opposing the outer circumferential surfaces of said annular members is a reduced diameter portion thereof.

3. A torque limiter as claimed in claim 2, further comprising a ring of non-magnetic material fitted into a recess formed by opposing steps formed on the outer circumferential surfaces of said annular members, an inner circumferential surface of said ring being disposed to oppose an outer circumferential surface of said disk, said tube-shaped adjustment member being slidable axially at said reduced diameter portion on an outer circumferential surface of the rings.

4. A torque limiter as claimed in claim 1 further comprising an annular disk-shaped plate having an outer diameter greater than an outer diameter of said permanent magnet and fixedly secured to said permanent magnet at an axially directed surface thereof situated opposite to a surface facing the one of said pair of annular members, an outer circumferential surface of the annular disk-shaped plate opposing a second portion of the inner circumferential surface of said tube-shaped adjustment member having a diameter greater than the diameter of the reduced diameter portion, an area of outer circumferential surface of the annular disk-shaped plate opposing the second portion being held constant with an axial motion of the adjustment member, said plate forming part of both said first and second magnet circuits.

5. A torque limiter as claimed in claim 1, further comprising sliding means for axially sliding said tube-shaped adjustment member with respect to said annular members, thereby changing the magnetic reluctance of said first and second magnetic circuits and adjusting a maximum magnitude of a transmitted torque.

6. A torque limiter as claimed in claim 5, wherein said sliding means comprises a tube fixed to said adjustment member and having a female thread on an inner circumferential surface thereof, and a screw support member fixed to one of said annular members other than the one to which said permanent magnet is fixed, said screw support member having formed on an outer circumferential surface thereof a male thread engaging with said female thread of said tube, said tube being rotated around said support member to move said adjustment member in an axial direction.

7. A torque limiter as claimed in claim 1 wherein the permanent magnet has a non-linear demagnetization curve.

8. A torque limiter for transmitting torque up to a preset maximum magnetic comprising:
a rotatable supporting member;
a disk of magnetic material having first and second sides fixed to the supporting member for rotation therewith;
first and second members of magnetic material rotatably supported on said supporting member and disposed adjacent to the first and second sides of said disk to form gaps between said first and second members and the first and second sides;
a quantity of powdered magnetic material disposed in the gaps;
a permanent magnet secured to said first member; and
an adjustment member of magnetic material slidably adjustably disposed adjacent to said first and second members and said permanent magnet, said adjustment member having first and second surfaces opposing said first and second members through first and second gaps, respectively, providing first and second areas which vary inversely when said adjustment member is slidably adjusted while said first and second gaps remain constant;
said adjustment member, said permanent magnet, and said first member providing a first magnetic circuit, said adjustment member, said permanent magnet, said first and second members, said disk, and said powdered magnetic material providing a second magnetic circuit, the first magnetic circuit having a reluctance determined in part by said second gap, the second magnetic circuit having a reluctance determined in part by said first gap and said gaps having said powdered magnetic material, the second gap having a constant width which is greater than the first gap, and the sum of the magnetic reluctances of the first and second magnetic circuits being substantially constant as said adjustment member is adjusted, such that the total flux flowing through the magnetic circuits and generated by said permanent magnet remains substantially constant and whereby said permanent magnet remains at a substantially constant magnetization level over long periods of usage notwithstanding repeated axial adjustments of said adjustment member.

9. A torque limiter for transmitting torque which is less than or equal to a pre-set magnitude that can be varied comprising:
a rotatable member;
a disk of magnetic material fixedly secured to said rotatable member for rotation therewith and having a pair of side surfaces at opposite sides thereof;

first and second annular members of magnetic material rotatably supported on said rotatable member, said first and second annular members being disposed at opposite sides of said disk to form a pair of gaps between the opposite side surfaces of said disk and said annular members;

an amount of powdered magnetic material disposed in said gaps between said disk and said first and second annular members;

means for forming a first magnetic circuit which passes through said first and second annular members and said powdered magnetic material, said first magnetic circuit having a first magnetic reluctance;

shunting means for shunting a part of said first magnetic circuit so as to provide a second magnetic circuit which bypasses said powdered magnetic material, said second magnetic circuit having a second magnetic reluctance; and adjusting means for adjusting the second magnetic reluctance of said second magnetic circuit to change the magnetic flux passing through said powdered magnetic material so as to provide a desired binding force between said first and second annular member and said disk while maintaining the sum of the magnetic reluctances of said first and second magnetic circuit substantially constant as said adjusting means adjusts the second magnetic reluctance of said second magnetic circuit.

* * * * *